(No Model.)
B. A. LEWIS.
DRAWER PULL.
No. 289,669. Patented Dec. 4, 1883.
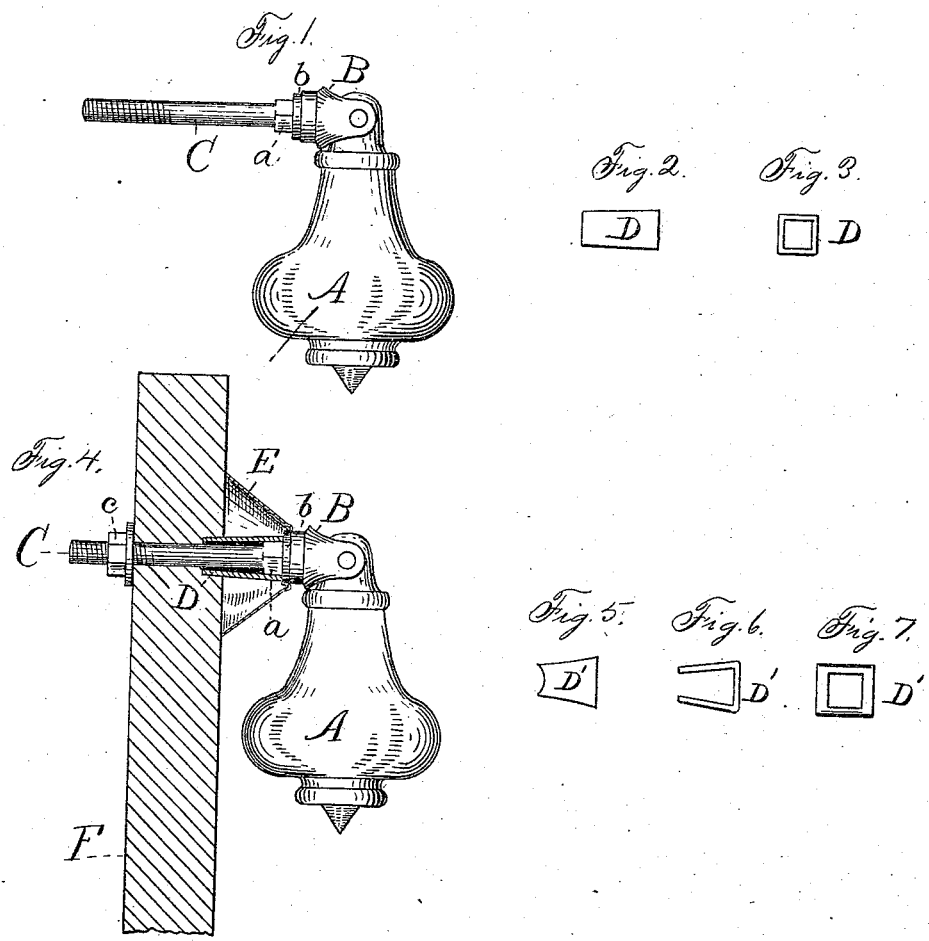

UNITED STATES PATENT OFFICE.

BURDETTE A. LEWIS, OF PLAINVILLE, CONNECTICUT.

DRAWER-PULL.

SPECIFICATION forming part of Letters Patent No. 289,669, dated December 4, 1883.

Application filed April 26, 1883. (No model.)

*To all whom it may concern:*

Be it known that I, BURDETTE A. LEWIS, a citizen of the United States, residing at Plainville, in the county of Hartford and State of Connecticut, have invented certain new and useful Improvements in Drawer-Pulls, of which the following is a specification.

My invention relates to improvements in drawer-pulls of that class which have a spindle or bolt extending through the drawer-front, by means of which spindle the drawer-pull is attached to said drawer-front; and the object of my improvements is to provide a cheap and efficient means for preventing the spindle, with drawer-pull attached, from turning within the drawer-front.

Prior to my invention a portion of the spindle which entered the wood of the drawer-front has been made of an angular form, to prevent it from turning, said angular portion being formed upon the spindle itself as an integral part thereof, and the same is hereby disclaimed.

In the accompanying drawings, Figure 1 is a side elevation of parts of my drawer-pull. Fig. 2 is a side elevation of the angular sleeve for said pull. Fig. 3 is an end view of the same. Fig. 4 is a vertical section of a drawer-front, the angular sleeve, and the cone-shaped escutcheon, and a side elevation of the remaining parts of my pull. Figs. 5, 6, and 7 are side, edge, and end views, respectively, of a modified form of sleeve for use with my drawer-pull.

The knob or handle A and the head B, to which it is hinged, are of ordinary construction, and said head is secured to the spindle C in any ordinary manner. The spindle C is of ordinary construction, with the single exception of the squared portion $a$ just under the shoulder-flange $b$, upon which flange the head B rests. I form said spindle with the flange $b$ and squared portion $a$ integral therewith, by heading the same from wire in a rivet-machine.

D designates a tubular sleeve or holder, which is square in cross-section, and preferably a little tapering, as shown, and it is of a size and form to fit and receive the squared portion $a$ of the spindle, as shown in Fig. 4. This sleeve is a little longer than the height of the cone-shaped escutcheon E, as shown in said Fig. 4, so that when placed upon the spindle with one end resting against the shoulder-flange $b$, its opposite end will project far enough to enter the wood in the drawer-front F. The sleeve or holder may be made so small that after boring a round hole for the spindle said sleeve may be drawn into the wood by tightening up the nut $c$, and without any previous cutting out or enlargement of the spindle-hole. If desired, however, said hole may be mortised out by a chisel or other proper tool preparatory to the application of the spindle and holder. The escutcheon need not be cone-shaped, but may be of any desired form, and instead of a drop-pull any ordinary form of pull may be employed.

The sleeve or holder D' is formed of a strip of sheet metal, with its two ends bent to form spurs, as shown most clearly in Fig. 6, and with a square hole made in the solid end or middle portion of the strip, as shown in Fig. 7. It may be slipped upon the squared portion of the spindle as a substitute for the sleeve or holder D.

Instead of making the angular portion $a$ of the spindle and of the sleeve or holder of a square form, other angular forms which will prevent the spindle from turning within the holder and drawer-front may be employed. The escutcheon covers up the holder, so as to conceal it from view.

By making a portion of the spindle under the shoulder of the flange angular, and then fitting a holder thereto, I can form the parts very cheaply, as it makes but little change in the construction of the spindle. I can also make said spindle of the same size as in ordinary drawer-pulls of this class.

I claim as my invention—

In a drawer-pull, the combination of the spindle having an angular portion and the sleeve or holder fitted upon said portion of the spindle and under the escutcheon, substantially as described, and for the purpose specified.

BURDETTE A. LEWIS.

Witnesses:
JOSEPH FLYNN,
R. C. USHER.